(12) United States Patent
Takahashi et al.

(10) Patent No.: US 6,375,592 B1
(45) Date of Patent: Apr. 23, 2002

(54) AUTOMATIC TRANSMISSION FOR VEHICLE

(75) Inventors: Tsukasa Takahashi; Tetsuo Naraki; Eiichiro Kawahara, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/689,716

(22) Filed: Oct. 13, 2000

(30) Foreign Application Priority Data

Dec. 7, 1999 (JP) .......................................... 11-347625

(51) Int. Cl.$^7$ ................................................. F16H 3/74
(52) U.S. Cl. ........................................................ 475/262
(58) Field of Search ......................................... 475/262

(56) References Cited

U.S. PATENT DOCUMENTS

| | | | | |
|---|---|---|---|---|
| 5,263,906 A | * | 11/1993 | Antonov | 475/257 |
| 5,409,428 A | * | 4/1995 | Antonov | 475/258 |
| 5,423,406 A | * | 6/1995 | Antonov | 192/103 A |
| 5,514,043 A | | 5/1996 | Antonov | |
| 5,514,044 A | * | 5/1996 | Antonov | 475/257 |
| 5,885,180 A | * | 3/1999 | Antonov | 475/116 |
| 6,155,952 A | * | 12/2000 | Antonov | 475/266 |

\* cited by examiner

*Primary Examiner*—Dirk Wright
(74) *Attorney, Agent, or Firm*—Arent Fox Kintner Plotkin & Kahn, PLLC

(57) ABSTRACT

An automatic transmission for a vehicle comprises: an input shaft (2) connected to the output shaft of an engine; a first planetary gear unit (10) including a helical sun gear (12), helical planet pinions (13) supported for rotation on a planet carrier (14), and a helical ring gear (11); a first clutch (17) interposed between the input shaft (2) and the first output shaft (15) and capable of being engaged by an action of flyweights operated by centrifugal force and of being disengaged by thrust exerted on the helical gears; a second planetary gear unit (20) including a helical sun gear (22), helical planet pinions (23) supported for rotation on a planet carrier (24), and a helical ring gear (21); a second clutch (27) interposed between the first output shaft (15) and the second output shaft (25) and capable of being engaged by the action of flyweights operated by centrifugal force and of being disengaged by thrust exerted on the helical gears; and a two-speed transmission unit (30) including a first high-speed gear (31) for a high-speed transmission system, mounted on the second output shaft (25), a first low-speed gear (32) for a low-speed transmission system, mounted on the second output shaft (25), a second high-speed gear (33) engaged with the first high-speed gear (31) and connected through a third clutch (37) to a third output shaft (35), and a second low-speed gear (34) engaged with the first low-speed gear (32) and connected through a one-way clutch (36) to the third output shaft (35). The sun gear (12)(or the ring gear (11)) is connected to the input shaft (2), the ring gear (11) (or the sun gear (12)) is connected through a one-way clutch (16) to a fixed member such that the same can be restrained from rotation relative to the fixed member, the planet carrier (14) is connected to a first output shaft (15). The sun gear (22) (or the ring gear (21)) is connected to the first output shaft (15), the ring gear (21) (or the sun gear (22)) is connected through a one-way clutch (26) to a fixed member such that the same can be restrained from rotation relative to the fixed member and the planet carrier (24) is connected to a second output shaft (25). The two-speed transmission unit (30) serves as the high-speed transmission system when the third clutch (37) is engaged by the agency of the one-way clutch (36) or as the low-speed transmission system when the third clutch (37) is disengaged.

3 Claims, 1 Drawing Sheet

AUTOMATIC TRANSMISSION FOR VEHICLE

BACKGROUND OF THE INVENTION

1. Field of the Invention

The present invention relates to an automatic transmission for a vehicle and, more particularly to an automatic transmission including planetary gear units each incorporating a centrifugal clutch.

2. Description of the Related Art

A known automatic transmission disclosed in U.S. Pat. No. 5,514,043 includes four planetary gear units of helical gears each incorporating a centrifugal clutch that is engaged by flyweights that are moved radially by centrifugal force and is disengaged by thrust exerted on the helical gears of the planetary gear unit. The four planetary gear units are connected in series. Each planetary gear unit has a ring gear mounted on an input shaft and serving as an input member, and a planet carrier mounted on an output shaft and serving as an output member. The centrifugal clutch is interposed between the ring gear and the planet carrier. The planetary gear unit is a two-speed transmission that reduces the rotating speed of the input shaft and lowers the rotating speed of the output shaft when the centrifugal clutch is disengaged, and rotates the input shaft and the output shaft at the same rotating speed for direct drive when the centrifugal clutch is engaged.

The four planetary gear units are connected in series to set the automatic transmission for a first speed by disengaging all the four centrifugal clutches, for a second speed by engaging one of the four centrifugal clutches, for a third speed by engaging two of the four centrifugal clutches, for a fourth speed by engaging three of the four centrifugal clutches and for a fifth speed by engaging all the four centrifugal clutches. When the automatic transmission is set for fifth speed by engaging all the four centrifugal clutches, the output shaft of the automatic transmission rotates at a rotating speed equal to that of the input shaft of the same to serve as a transmission of a gear ratio of 1 to 1.

When the automatic transmission is set for the highest speed, i.e., the fifth speed, the input shaft is connected directly to the output shaft for direct drive in which the rotating speed of the output shaft is equal to that of the input shaft. Therefore, this automatic transmission cannot function as an overdrive. Thus, the planetary gear units nearer to the output end of the automatic transmission must have greater torque capacities, and the component gears, clutches and bearings of those planetary gear units must bear considerably large load and hence must be formed in large units requiring large spaces for installation to secure necessary strength.

SUMMARY OF THE INVENTION

The present invention has been made in view of those problems and it is therefore an object of the present invention to provide a small multispeed automatic transmission for a vehicle employing planetary gear units of helical gears each including a centrifugal clutch that is engaged by the action of flyweights operated by centrifugal force and is disengaged by thrust exerted on the helical gears, and capable of functioning as an overdrive.

According to a first aspect of the present invention, an automatic transmission for a vehicle comprises: an input shaft connected to the output shaft of an engine; a first planetary gear unit including a helical sun gear, helical planet pinions supported for rotation on a planet carrier, and a helical ring gear, the sun gear (or the ring gear) being connected to the input shaft, the ring gear (or the sun gear) being connected through a one-way clutch to a fixed member such that the same can be restrained from rotation relative to the fixed member, the planet carrier being connected to a first output shaft; a first clutch interposed between the input shaft and the first output shaft, and capable of being engaged by the action of flyweights operated by centrifugal force and of being disengaged by thrust exerted on the helical gears; a second planetary gear unit including a helical sun gear, helical planet pinions supported for rotation on a planet carrier, and a helical ring gear, the sun gear (or the ring gear) being connected to the first output shaft, the ring gear (or the sun gear) being connected through a one-way clutch to a fixed member such that the same can be restrained from rotation relative to the fixed member, the planet carrier being connected to a second output shaft; a second clutch interposed between the first and the second output shaft, and capable of being engaged by the action of flyweights operated by centrifugal force and of being disengaged by thrust exerted on the helical gears; and a two-speed transmission unit including a first high-speed gear for a high-speed transmission system, mounted on the second output shaft, a first low-speed gear for a low-speed transmission system, mounted on the second output shaft, a second high-speed gear engaged with the first high-speed gear and connected through a third clutch to a third output shaft, and a second low-speed gear engaged with the first low-speed gear and connected through a one-way clutch to the third output shaft; wherein the two-speed transmission unit serves as the high-speed transmission system when the third clutch is engaged by the agency of the one-way clutch or as the low-speed transmission system when the third clutch is disengaged.

Since the two-speed transmission unit capable of functioning either as a high-transmission system or a low-speed transmission system is disposed below the first planetary gear unit that operates as a two-speed gear unit capable of being set for either of a direct-drive speed and a reduction speed, and the second planetary gear unit that operates as a two-speed gear unit capable of being set for either of a direct-drive speed and a reduction speed, the automatic transmission is capable of providing eight speeds.

Accordingly, the torque capacities of the two-speed transmission unit and component members below the two-speed transmission unit may be small, load on the two-speed transmission unit and the gears, the clutches and the bearings below the two-speed transmission unit is reduced, so that the automatic transmission can be formed in a small, lightweight unit that can be installed in a small space.

Preferably, the third clutch of the automatic transmission is engaged while the vehicle is stopped.

When the third clutch is engaged with the vehicle stopped on an uphill road, a torque tending to turn the driving wheels of the vehicle in the reverse direction is transmitted through the third clutch to the second high-speed gear engaging the first high-speed gear and through the one-way clutch to the second low-speed gear engaging the first low-speed gear, so that the driving wheels are restrained from reverse rotation. Consequently, the backward movement of the vehicle can be prevented without requiring creep control and specific fuel consumption can be reduced.

Preferably, a reversing mechanism is connected to the third output shaft.

When the reversing mechanism is connected to the third output shaft on the downstream side that may have a small torque capacity for overdriving operation, load on a clutch, gears and bearings included in the reversing mechanism is reduced and the reversing mechanism can be formed in a small, lightweight unit.

BRIEF DESCRIPTION OF THE DRAWINGS

The above and other objects, features and advantages of the present invention will become more apparent from the following description taken in connection with the accompanying drawings.

DESCRIPTION OF THE PREFERRED EMBODIMENTS

Figure 1:
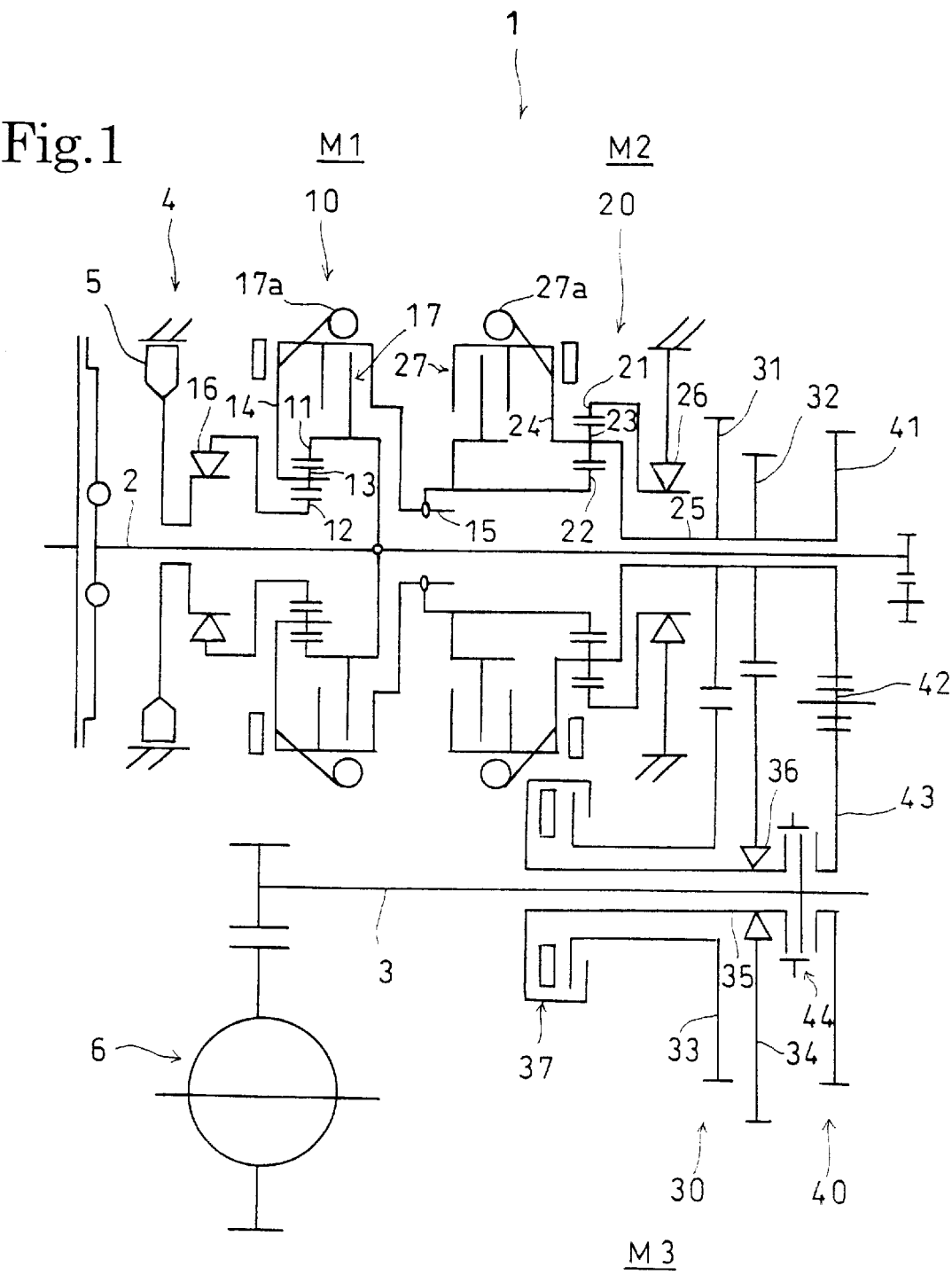
FIG. 1 is a diagrammatic view of an automatic transmission in a preferred embodiment according to the present invention for a front-engine front-drive vehicle.

Referring to FIG. 1 showing an automatic transmission 1 in a preferred embodiment according to the present invention for a front-engine front-drive vehicle (hereinafter referred to as "FF vehicle"), coaxially mounted in a sequential arrangement on an input shaft 2 for transmitting the output power of an internal combustion engine are an electromagnetic clutch 4, a first planetary gear unit 10 and a second planetary gear unit 20. An output shaft 3 is disposed in parallel to the input shaft 2. A two-speed transmission unit 30 and a reverse drive unit 40 are mounted on the output shaft 3 to interlock the output shaft 3 with the input shaft 2. The rotation of the output shaft 3 of the automatic transmission 1 is transmitted through a differential gear 6 to driving wheels.

The first planetary gear unit 10 includes a ring gear 11, a sun gear 12, planet pinions 13, which are helical gears. The ring gear 11 is fixedly mounted on the input shaft 2. The sun gear 12 supported on the input shaft 2 is coupled with a clutch disk 5 of the electromagnetic clutch 4 by a one-way clutch 16. The clutch disk 5 can be fastened to a stationary casing member. A planet carrier 14 supporting the planet pinions 13 is fixedly mounted on a first output shaft 15.

A first centrifugal clutch 17 is interposed between the planet carrier 14 and the ring gear 11. The first centrifugal clutch 17 is controlled by flyweights 17 a supported on the planet carrier 14 so as to be moved by centrifugal force.

In a state where the electromagnetic clutch 4 is engaged and the first centrifugal clutch 17 is disengaged, the ring gear 11 rotates together with the input shaft 2, the planet pinions 13 rotate and revolve around the sun gear 12, which is allowed to rotate only in one direction by the one-way clutch 16, and thereby the planet carrier 14 rotates together with the first output shaft 15.

In a state where the first centrifugal clutch 17 is disengaged, the first output shaft 15 fixedly supporting the planet carrier 14 rotates at a rotating speed lower than that of the input shaft 2 for a speed reduction mode; that is, the speed ratio a=(Output rotating speed)/(Input rotating speed)<1.

In a state where the first centrifugal clutch 17 is engaged, the input shaft 2 and the planet carrier 14 are engaged and the first output shaft 15 rotates at a rotating speed equal to that of the input shaft 2 for a direct drive mode.

The first centrifugal clutch 17 is engaged by centrifugal force acting on the flyweights 17a and is disengaged by thrust exerted on the helical gears of the first planetary gear unit 10.

The second planetary gear unit 20 includes a ring gear 21, a sun gear 22, planet pinions 23, which are helical gears. The sun gear 22 is interlocked with the first output shaft 15 by splines. The ring gear 21 can be fastened to the stationary casing member by a one-way clutch 26. A planet carrier 24 supporting the planet pinions 23 is fixedly mounted on a second output shaft 25.

A second centrifugal clutch 27 is interposed between the planet carrier 24 and the sun gear 22. The second centrifugal clutch 27 is controlled by flyweights 27a supported on the planet carrier 24 so as to be moved by centrifugal force. In a state where the second centrifugal clutch 27 is disengaged, the sun gear 22 fixedly mounted on the first output shaft 15 rotates the planet pinions 23, the planet pinions 23 revolve along the ring gear 21, i.e., an internal gear, so that the planet carrier 24 rotates together with the second output shaft 25.

In a state where the second centrifugal clutch 27 of the second planetary gear unit 20 is engaged, the second output shaft 35 fixedly supporting the planet carrier 24 rotates at a rotating speed lower than that of the first output shaft 15 fixedly supporting the sun gear 22 for a speed reduction mode; that is, the speed ratio b=(Output rotating speed)/(Input rotating speed)<1.

In a state where the second centrifugal clutch 27 is engaged, the sun gear 22 and the planet carrier 24 are fastened together and the rotation of the sun gear 22 is transmitted directly to the second output shaft 25 in a direct drive mode and hence the speed ratio b=1.

The second centrifugal clutch 27, similarly to the first centrifugal clutch 17, is engaged by centrifugal force acting on the flyweights 27a and is disengaged by thrust exerted on the helical gears of the second planetary gear unit 20.

Fixedly mounted on the second output shaft 25 are a first high-speed gear 31, a first low-speed gear 32 and a first reverse gear 41. A third output shaft 35 is supported for rotation on the output shaft 3 extended in parallel to the input shaft 2. A second high-speed gear 33 engaging the first high-speed gear 31, and a second low-speed gear 34 engaging the first low-speed gear 32 are supported on the third output shaft 35. The second high-speed gear 33 can be locked to the third output shaft 35 by a hydraulic clutch 37. The second low-speed gear 34 is coupled with the third output shaft 35 by a one-way clutch 36. An electromagnetic clutch may be used instead of the hydraulic clutch 37.

The gear ratio H=(First high-speed gear 31)/(Second high-speed gear 32)>1 and the gear ratio L=(First low-speed gear 32)/(second low-speed gear 34)<1. In a state where the hydraulic clutch 37 is engaged, the rotation of the second high-speed gear 34 engaging the first high-speed gear 31 is transmitted to the third output shaft 35 to rotate the third output shaft 35 for high-speed rotation. Although the second low-speed gear 34 engaging the first low-speed gear 32 rotates in this state, the rotating speed of the third output shaft 35 is higher than that of the second low-speed gear 34 and hence the rotation of the third output shaft 35 is not affected by the rotation of the second low-speed gear 34 because the second low-speed gear 34 is coupled with the third output shaft 35 by the one-way clutch 36. The rotation of the second output shaft 25 is transmitted to the third output shaft 35 at the gear ratio L in a state where the hydraulic clutch 37 is disengaged, and the same is transmitted to the third output shaft 35 at the gear ratio H in a state where the hydraulic clutch 37 is engaged. Thus, the two-speed transmission unit 30 can be set for a high-speed drive mode or low-speed drive mode by operating the hydraulic clutch 37.

The first reverse gear 41 fixedly mounted on the second output shaft 25 is engaged with a second reverse gear 42, i.e., an intermediate gear, and the second reverse gear 42 is engaged with a third reverse gear 43 supported for rotation on the output shaft 3. Either the third output shaft 35 or the third reverse gear 43 is coupled selectively with the output shaft 3 by a forward-reverse selector clutch 44. The reverse drive unit 40 is thus formed. The forward-reverse selector clutch 44 is operated to drive the output shaft 3 selectively for a forward drive mode or a reverse drive mode.

In the automatic transmission 1, the first planetary gear unit 10 and the first centrifugal clutch 17 form a first module M1, the second planetary gear unit 20 and the second centrifugal clutch 27 form a second module M2, and the hydraulic clutch 37 and the two-speed transmission unit 30 form a third module. The clutches of the modules M1, M2 and M3 are engaged and disengaged selectively to provide eight speeds including a first to an eighth speed. Table 1 shows the condition of the clutches of the modules M1, M2 and M3 for those eight speeds. In Table 1, the condition of the clutches is represented by gear ratios. The clutches of the first module M1 and the second module M2 are engaged when the gear ratio is 1, and the same are disengaged when the speed ratio is a or b. The clutch of the third module M3 is engaged when the gear ratio is H and the same is disengaged when the gear ratio is L. In Table 1, H>1, H>L and 1>a>b.

TABLE 1

| Speed | M1 | M2 | M3 | Drive ratio |
| --- | --- | --- | --- | --- |
| First | a | b | L | a · b · L |
| Second | a | b | H | a · b · H |
| Third | 1 | b | L | b · L |
| Fourth | 1 | b | H | b · H |
| Fifth | a | 1 | L | a · L |
| Sixth | a | 1 | H | a · H |
| Seventh | 1 | 1 | L | L |
| Eighth | 1 | 1 | H | H |

The engagement and disengagement of the first centrifugal clutch 17 and the second centrifugal clutch 27 are dependent on the respective weights of the flyweights 17a and 27a and thrust exerted on the helical gears. The engagement and disengagement of the hydraulic clutch 37 are controlled for smooth, shockless upshifting and downshifting on the basis of a V–$\theta_{th}$ map showing the relation between engine speed V and throttle opening $\theta_{th}$, and the respective input and output rotating speeds of the modules.

As shown in Table 1, the drive ratio is H (>1) when the automatic transmission 1 is set for the eighth speed; that is, the automatic transmission 1 functions as an overdrive. Therefore, the torque capacities of the two-speed transmission unit 30 and the components below the two-speed transmission unit 30 may be small, load on the gears, clutches and bearings can be reduced and the multispeed automatic transmission can be formed in a compact, small, lightweight unit.

The eight-speed automatic transmission 1 improves the acceleration and fuel consumption of the internal combustion engine, and improves optimum speed selectivity.

The two-speed transmission unit 30 is simple in construction, is formed of a relatively small number of parts, is small and lightweight, requires a small space for installation and is easily controllable.

When the driving wheels tend to rotate in the reverse direction while the vehicle is stopping on an uphill road, the one-way clutch 36 is engaged. If the hydraulic clutch 37 is engaged in this state, a torque tending to rotate the driving wheels in the reverse direction is transmitted through the hydraulic clutch 37 to the second high-speed gear 33 and through the one-way clutch 36 to the second low-speed gear 34. Consequently, the second high-speed gear 33 and the second low-speed gear 34 try to turn the first high-speed gear 31 and the first low-speed gear 32 mounted on the second output shaft at different rotating speeds, respectively, causing a rotational conflict between the first high-speed gear 31 and the first low-speed gear 32 and hence the driving wheels are unable to turn in the reverse direction.

Thus, the backward movement of the vehicle after the vehicle has stopped during uphill running on an uphill road can be prevented, i.e., the so-called heel stop can be achieved, without requiring creep control by a torque converter, which is necessary with a vehicle provided with a general automatic transmission, by engaging the hydraulic clutch 37 when the vehicle is stopped and the throttle opening $\theta_{th}$ =0°, which reduces fuel consumption.

As obvious from Table 1, in this embodiment, the hydraulic clutch 37 is disengaged when the automatic transmission 1 is set for the first speed. If the hydraulic clutch 37 is engaged when the automatic transmission 1 is set for the first speed like a state of the second speed in Table 1, the hydraulic clutch 37 is engaged when the vehicle is stopped and the vehicle can be smoothly started without changing the condition of the hydraulic clutch 37 and without requiring complicated control operations.

The eight-speed automatic transmission 1 can be changed into a five-speed, six-speed or seven-speed automatic transmission by properly changing the timing of changing the condition of the hydraulic clutch 37. For example, if the hydraulic clutch 37 is kept engaged even if the automatic transmission 1 is set for the second speed and the traveling speed of the vehicle increases, the third speed is skipped and the automatic transmission is upshifted from the second speed to the fourth speed.

Table 2 shows another mode of controlling the clutches of the modules.

TABLE 1

| Speed | M1 | M2 | M3 | Drive ratio |
| --- | --- | --- | --- | --- |
| First | a | b | L | a · b · L |
| Second | 1 | b | L | b · L |
| Third | a | b | H | a · b · H |
| Fourth | 1 | b | H | b · H |
| Fifth | a | 1 | L | a · L |
| Sixth | 1 | 1 | L | L |
| Seventh | a | 1 | H | a · H |
| Eighth | 1 | 1 | H | H |

In Table 2, the ratios a, b, L and H meet inequalities: H>1, H>L and 1>a >b. Drive ratios for the first to the eighth speed increase in that order. The gear ratio H for the eighth speed is greater than 1 and the automatic transmission serves as an overdrive. Therefore, the torque capacities of the two-speed transmission unit 30 and the components below the two-speed transmission unit 30 may be small, load on the gears, clutches and bearings can be reduced and the multispeed automatic transmission can be formed in a small, lightweight unit.

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

What is claimed is:

1. An automatic transmission for a vehicle comprising:

an input shaft connected to an output shaft of an engine;

a first planetary gear unit including a helical sun gear, helical planet pinions supported for rotation on a planet carrier, and a helical ring gear, the sun gear or the ring gear being connected to the input shaft, the ring gear or the sun gear being connected through a one-way clutch to a fixed member such that the same can be restrained from rotation relative to the fixed member, the planet carrier being connected to a first output shaft;

a first clutch interposed between the input shaft and the first output shaft, and capable of being engaged by an action of flyweights operated by centrifugal force and of being disengaged by thrust exerted on the helical gears;

a second planetary gear unit including a helical sun gear, helical planet pinions supported for rotation on a planet carrier, and a helical ring gear, the sun gear or the ring gear being connected to the first output shaft, the ring gear or the sun gear being connected through a one-way clutch to a fixed member such that the same can be restrained from rotation relative to the fixed member, the planet carrier being connected to a second output shaft;

a second clutch interposed between the first and the second output shaft, and capable of being engaged by the action of flyweights operated by centrifugal force and of being disengaged by thrust exerted on the helical gears; and a two-speed transmission unit including a first high-speed gear for a high-speed transmission system, mounted on the second output shaft, a first low-speed gear for a low-speed transmission system, mounted on the second output shaft, a second high-speed gear engaged with the first high-speed gear and connected through a third clutch to a third output shaft, and a second low-speed gear engaged with the first low-speed gear and connected through a one-way clutch to the third output shaft;

wherein the two-speed transmission unit serves as the high-speed transmission system when the third clutch is engaged by the agency of the one-way clutch or as the low-speed transmission system when the third clutch is disengaged.

2. The automatic transmission for a vehicle according to claim 1, wherein the third clutch is engaged while the vehicle is stopped.

3. The automatic transmission according to claim 1, wherein a reversing mechanism is connected to the third output shaft.

* * * * *